(12) United States Patent
Crivella et al.

(10) Patent No.: US 11,279,468 B2
(45) Date of Patent: Mar. 22, 2022

(54) SYSTEMS AND METHODS FOR AIRCRAFT STRUCTURE SURFACE COVERS

(71) Applicant: THE BOEING COMPANY, Chicago, IL (US)

(72) Inventors: Michelle Crivella, Charleston, SC (US); Matthew Berden, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 517 days.

(21) Appl. No.: 16/254,101

(22) Filed: Jan. 22, 2019

(65) Prior Publication Data

US 2020/0231272 A1 Jul. 23, 2020

(51) Int. Cl.
*B64C 23/00* (2006.01)

(52) U.S. Cl.
CPC .................. *B64C 23/005* (2013.01)

(58) Field of Classification Search
CPC .......................... B64C 23/005; B64C 2230/26
See application file for complete search history.

(56) References Cited

U.S. PATENT DOCUMENTS

| | | | |
|---|---|---|---|
| 3,065,940 A | 11/1962 | Eckstein | |
| 5,133,516 A * | 7/1992 | Marentic | B29C 59/022 |
| | | | 244/130 |
| 5,486,096 A * | 1/1996 | Hertel | F01D 5/288 |
| | | | 416/224 |
| 6,516,652 B1 * | 2/2003 | May | F15D 1/12 |
| | | | 73/10 |
| 8,578,747 B2 | 11/2013 | Li et al. | |
| 8,668,166 B2 | 3/2014 | Rawlings et al. | |
| 9,465,127 B2 * | 10/2016 | Karlsen | G01V 13/00 |
| 9,701,389 B2 * | 7/2017 | Gradert | B32B 3/26 |
| 9,714,083 B2 * | 7/2017 | Rawlings | B64C 21/10 |
| 10,001,015 B2 * | 6/2018 | Shelman-Cohen | B63B 1/34 |
| 10,352,171 B2 * | 7/2019 | Shelman-Cohen | B64C 11/18 |
| 10,994,832 B2 * | 5/2021 | Linde | F15D 1/004 |
| 2004/0126541 A1 * | 7/2004 | Dietz | B64C 21/10 |
| | | | 428/167 |
| 2011/0073710 A1 * | 3/2011 | Rawlings | F15D 1/12 |
| | | | 244/130 |

(Continued)

FOREIGN PATENT DOCUMENTS

| | | |
|---|---|---|
| DE | 102013102164 A1 | 9/2014 |
| EP | 0205289 A1 | 12/1986 |

OTHER PUBLICATIONS

Extended European Search Report dated May 26, 2020 for corresponding EP patent application No. 20152153; 9 pgs.

(Continued)

*Primary Examiner* — Philip J Bonzell
*Assistant Examiner* — Michael B. Kreiner
(74) *Attorney, Agent, or Firm* — The Small Patent Law Group LLC; Joseph M. Butscher

(57) ABSTRACT

An aircraft surface cover is provided. The aircraft surface cover includes a cover member that is configured to be removably secured to an aircraft structure. The cover member includes an exterior surface that has a microtextured surface including microtexture ribs that are configured to improve aerodynamic performance of the aircraft structure.

21 Claims, 8 Drawing Sheets

(56) References Cited

U.S. PATENT DOCUMENTS

| | | | |
|---|---|---|---|
| 2011/0186685 A1* | 8/2011 | Tsotsis | F15D 1/004 |
| | | | 244/130 |
| 2013/0062004 A1 | 3/2013 | Amirehteshami | |
| 2014/0255205 A1 | 9/2014 | Shelman-Cohen | |
| 2015/0284058 A1* | 10/2015 | Swain | B63B 59/045 |
| | | | 114/222 |
| 2016/0325824 A1 | 11/2016 | Rawlings | |
| 2018/0009136 A1* | 1/2018 | Rawlings | B32B 37/203 |
| 2018/0016028 A1 | 1/2018 | Kovach | |
| 2018/0266388 A1 | 9/2018 | Hallissy | |
| 2019/0202090 A1* | 7/2019 | Lanfant | B29C 45/263 |
| 2019/0202547 A1* | 7/2019 | Wu | F15D 1/12 |
| 2020/0139488 A1* | 5/2020 | Jetter | B23K 26/0676 |

OTHER PUBLICATIONS

Domel et al., "Shark Skin-Inspired Designs that Improve Aerodynamic Performance" They Royal Society Publishing; Feb. 2018 (40 pages).

Rogers "Harvard Engineers Look to Sharkskin to Boost Aerodynamic Performance" Interesting Engineers; Jul. 2018 (8 pages).

Burrows "Shark Skin-Inspired Designs Improve Aerodynamic Performance" SciTech Daily; Jul. 2018 (7 pages).

\* cited by examiner

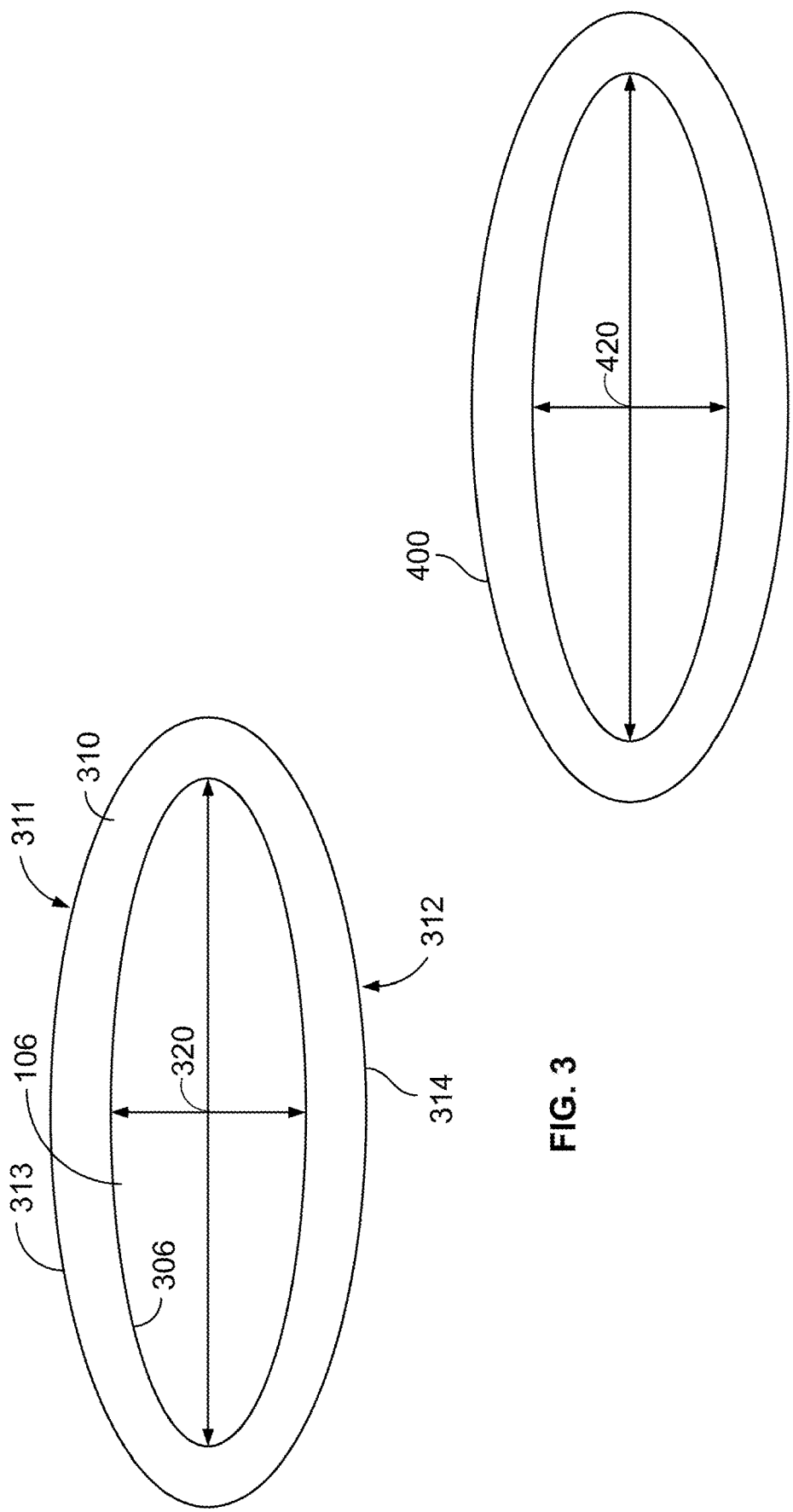

SYSTEMS AND METHODS FOR AIRCRAFT STRUCTURE SURFACE COVERS

FIELD OF THE DISCLOSURE

Examples of the present disclosure generally relate to systems and methods for providing microtextured surfaces for aircraft structures.

BACKGROUND OF THE DISCLOSURE

Microtextured skin patterns may be utilized on airfoil surfaces to improve aerodynamic properties (e.g., drag and/or lift). However, such skin patterns may be difficult or expensive to manufacture, install, and/or maintain.

For example, use of machining or other means of subtracting from an airfoil surface (e.g., laser ablation, etching) may reduce durability of the airfoil, and may result in expensive and/or inconvenient repair and/or installation. As another example, techniques such as hot metal rolling or pressing may distort the surface, and also result in expensive and/or inconvenient repair and/or installation.

SUMMARY OF THE DISCLOSURE

A need exists for an improved system and an improved method for providing microtextured surfaces to airfoil surfaces.

With those needs in mind, certain examples of the present disclosure provide an aircraft surface cover. The aircraft surface cover includes a cover member that is configured to be removably secured to an aircraft structure. The cover member includes an exterior surface that has a microtextured surface including microtexture ribs that are configured to improve aerodynamic performance of the aircraft structure.

Certain examples of the present disclosure provide a method of improving aerodynamic performance of an aircraft structure. The method includes providing a cover member comprising an exterior surface that has a microtextured surface. The microtextured surface includes microtexture ribs configured to improve aerodynamic performance of the aircraft structure. The method also includes securing the cover member to the aircraft structure.

Certain examples of the present disclosure provide an aircraft assembly that includes an aircraft structure and a cover member. The aircraft structure is disposed on an exterior of an aircraft. The cover member is removably secured to the aircraft structure, and includes an exterior surface. The exterior surface has a microtextured surface that includes microtexture ribs that are configured to improve aerodynamic performance of the aircraft structure.

BRIEF DESCRIPTION OF THE DRAWINGS

FIG. 3 provides a cross-sectional view of a sleeve disposed around a circumference of an aircraft structure, according to an example of the present disclosure.

FIG. 4 provides a side view of an elastic sleeve, according to an example of the present disclosure.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition may include additional elements not having that condition.

Examples of the present disclosure provide systems, methods, and assemblies for applying a microtextured pattern to an outer surface of an aircraft (e.g., wing surface) without requiring extensive work to the surface. Various examples provide a removably secured cover member to provide the microtextured surface. Various examples provide a sleeve or other cover that may be replaced throughout the service life of the aircraft without extensive rework of the surface, conveniently and effectively providing improved aerodynamic performance.

Figure 1:
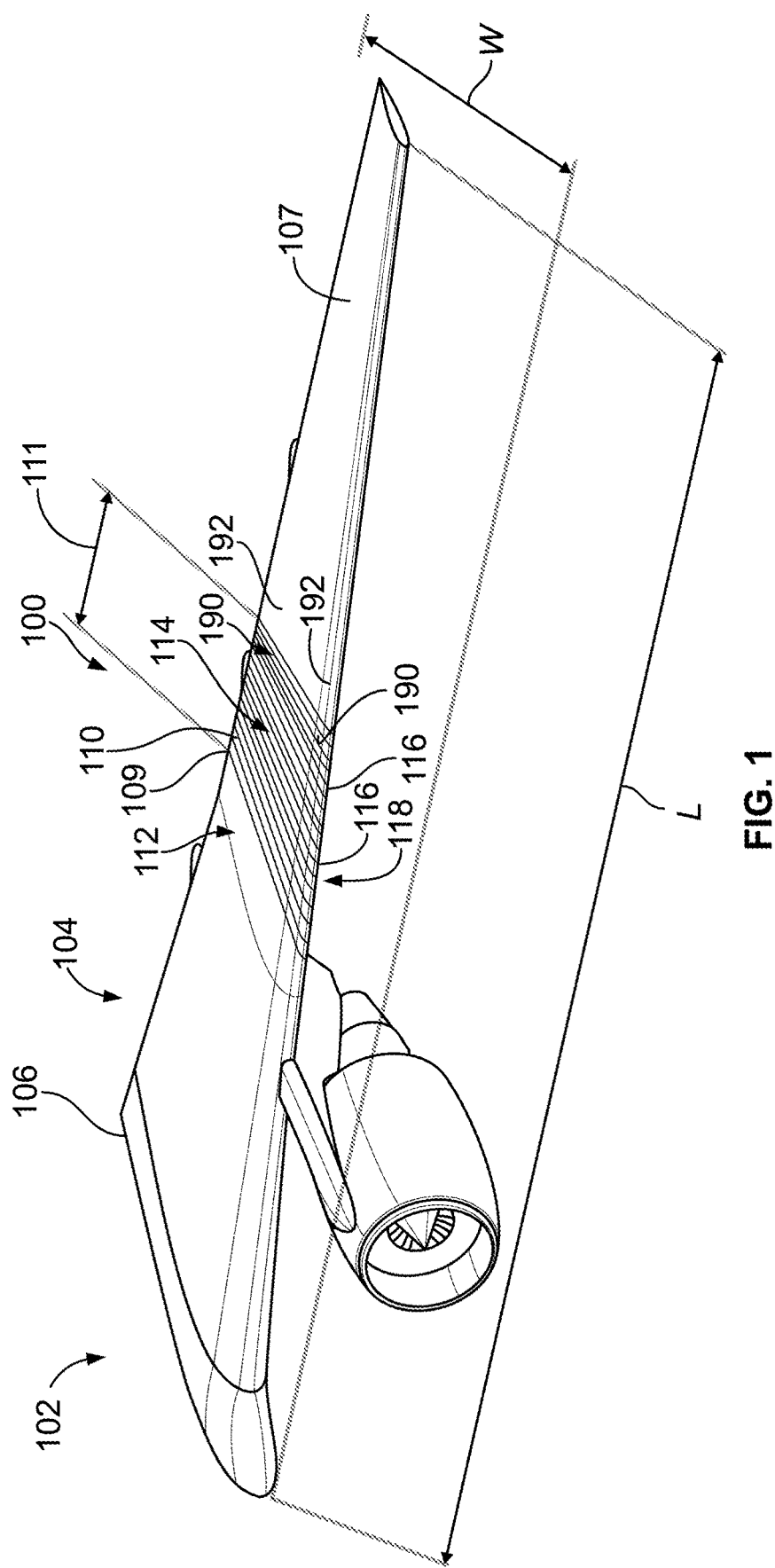
FIG. 1 illustrates a perspective view of an aircraft assembly, according to an example of the present disclosure.

FIG. 1 illustrates a perspective top view of an aircraft assembly 100. The aircraft assembly 100 includes an aircraft structure 106 and an aircraft surface cover 109 that includes a cover member 110. The aircraft structure 106 is disposed on an exterior 104 of an aircraft 102. For example, the aircraft structure 106 in the illustrated example is a wing 107 having a width W and a length L. It may be noted that the width W varies over length L. Other examples of aircraft structures that may be utilized in various examples include tails, flaps, or rotors (e.g., helicopter rotor blades).

The cover member 110 is removably secured to the aircraft structure 106. "Removably secured" as used herein may be understood as meaning that the cover member 110 is attached as a unit to the aircraft structure 106 while not becoming an integral part of the aircraft structure 106. By way of example, and for the purposes of clarity, a layer that was printed on the aircraft structure 106 would not be removably secured as used herein, at least because it was not applied as a unit. As another example, and for the purposes of clarity, a structure that were welded to the aircraft structure 106 would not removably secured as used herein, at least because welding would render the structure integral with the aircraft structure 106. As one more example for the purposes of clarity, a surface that was machined into the aircraft structure 106 would not be removably secured as used herein, at least because such machining would make the surface an integral part of the aircraft structure 106. Generally, removably secured cover members as discussed herein may be added to an aircraft structure 106 after the aircraft 102 has been assembled, and removed non-destructively with respect to the aircraft structure 106, and without adversely affecting the structural integrity of the aircraft structure 106. Further, removably secured cover members as discussed herein may be removed with minimal or no effect on the surface finish of the aircraft structure 106. For example, in some examples, remnants of adhesive may be left on the surface after removal of a removably secured cover member. It may be noted that the removal process may be non-destructive as well with respect to the cover member 110 in various examples. For example, the cover member 110 may include a compressible sleeve that may be stretched for removal from the aircraft structure 106. Alternatively, in other examples, the cover member 110 may be destructively removed from the aircraft structure 106, for example by cutting through the cover member 110.

The cover member 110 includes an exterior surface 112. The exterior surface 112 has a microtextured surface 114. The microtextured surface 114 is disposed on the exterior surface 112 and oriented toward an atmosphere surrounding the aircraft 102. Accordingly, air passes over the microtextured surface 114 as the aircraft 102 moves. The microtextured surface 114 includes microtexture ribs 116 that are configured to improve aerodynamic performance of the aircraft structure 106. For example, the microtexture ribs 116 may be configured to improve drag and/or lift. In the illustrated example, the microtexture ribs 116 are separated by grooves 118. In various examples, the microtexture ribs 116 may have a height of about 0.5 millimeters and have about 1 millimeter spacing between adjacent ribs. While the illustrated example shows ribs extending along the entire width W, it may be noted that ribs may be shorter in other examples. In various examples, the ribs may be regularly or irregularly spaced, as well as uniformly or non-uniformly sized. Generally, the microtextured surface 114 may be provided in a predetermined pattern to provide improved aerodynamic performance, and the cover member 110 secured to the aircraft structure 106 with the microtextured surface 114 oriented in the predetermined pattern. In various examples, the microtexture ribs 116 may be configured to provide denticles or aspects of a sharkskin style surface design configured for improved aerodynamic performance.

As also discussed elsewhere herein, a variety of techniques may be used to mount or secure the cover member 110 to the aircraft structure 106. For example, the cover member 110 may be configured as a sleeve that wraps around the aircraft structure 106. As another example, the cover member 110 may be configured as a sheet that is adhesively joined to the aircraft structure 106. In various examples, one or more of an elastic material, heat shrinking, or adhesives may be used to secure the cover member 110 to the aircraft structure 106.

Accordingly, instead of being formed integrally with or permanently attached to the aircraft structure 106, the microtextured surface 114 is disposed on the removable cover member 110. Use of a removable cover member 110 with a microtextured surface 114 disposed thereon allows for quick and convenient replacing and/or repairing of a microtextured surface 114 without requiring extensive re-work of the aircraft structure 106 itself. The cover member 110 may be conveniently replaced periodically at pre-determined intervals or as needed.

Figure 2:
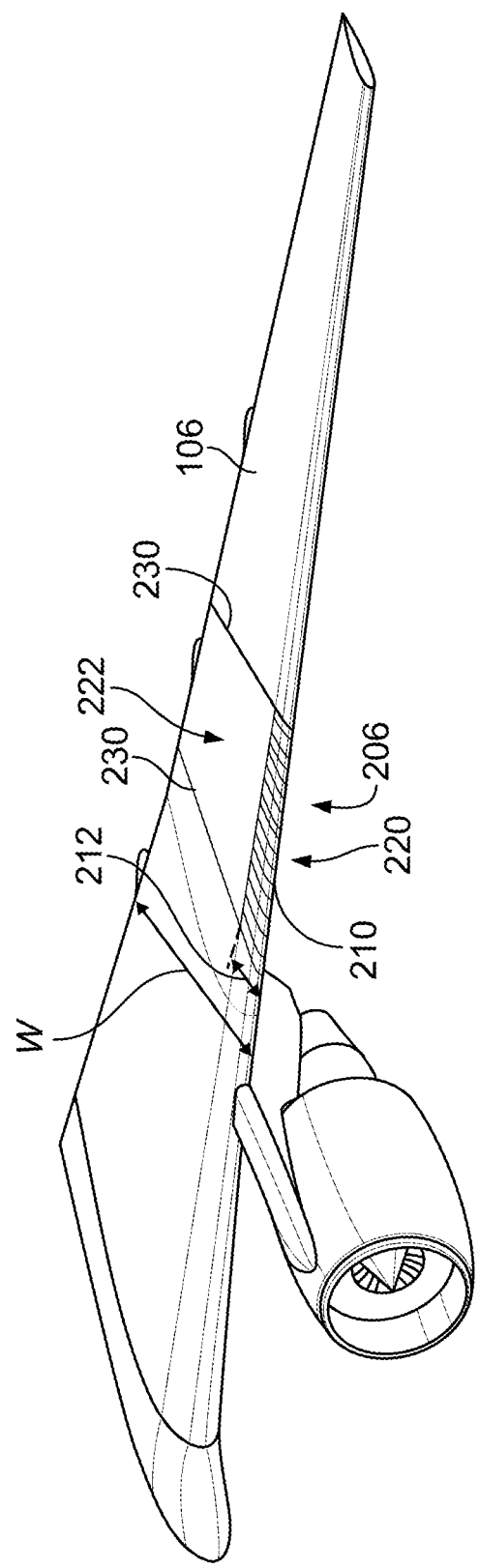
FIG. 2 provides a perspective view of a partial cover disposed on an aircraft structure, according to an example of the present disclosure.

It may be noted that the cover member 110 depicted in FIG. 1 extends along the entire width W of the aircraft structure 106 at the location along the length L at which the cover member 110 is positioned. However, in other examples, the cover member 110 may be understood as including or being configured as a partial cover that only extends along a portion (and not the entirety) of the width W. Such a partial cover may also be referred to as a bra or leading surface cover. FIG. 2 provides a perspective view of a partial cover 210 disposed on the aircraft structure 106 in accordance with various examples. The partial cover 210 may be understood as an example of cover member 110, and includes microtextured ribs on an exterior surface as discussed above. As seen in FIG. 2, the depicted partial cover 210 is configured (e.g., sized and shaped) to cover a leading portion 206 of the aircraft structure 106 (e.g., a portion of the aircraft structure 106 oriented toward the direction of travel). As seen in FIG. 2, the partial cover 210 does not extend along the entire width W of the aircraft structure 106. Instead, the partial cover 210 only extends along a portion 212 of the width W, resulting in a covered portion 220 and an uncovered portion 222 of the aircraft structure 106. In the example depicted in FIG. 2, the partial cover 210 includes loops 230 to help secure and/or maintain the partial cover 210 in place. Alternatively or additionally, an adhesive may be used to secure the partial cover 210 in place, for example. Use of a partial cover 210 allows for efficient placement of microtextured surfaces of the partial cover 210 toward a front or leading surface of the aircraft structure 106 while allowing for a relatively small cover and/or allowing access to a larger portion of the surface of the aircraft structure 106.

In various examples, the cover member includes or is configured as a sleeve that is configured (e.g., sized and shaped) to extend around a circumference of the aircraft structure. FIG. 3 provides a cross-sectional view of a sleeve 310 disposed around a circumference 306 of an aircraft structure 106. The sleeve 310 may be understood as an example of the cover member 110. As seen in FIG. 3, in contrast to the partial cover 210 of FIG. 2, the sleeve 310 depicted in FIG. 3 extends along the entire circumference 306 of the aircraft structure 106 to define a closed loop around a cross-section of the aircraft structure 106 taken at a point along its length L. It may be noted that the sleeve 310 has an upper exterior surface portion 311 and a lower exterior surface portion 312. A microtextured surface as discussed herein is disposed on at least one of the upper exterior surface portion 311 or lower exterior surface portion 312. In various examples, a microtextured surface may be disposed on all or a portion of the upper exterior surface portion 311 and/or lower exterior surface portion 312. It may be noted that in various examples an upper microtextured surface 313 (disposed on all or a portion of the upper exterior surface portion 311) may be configured differently than a lower microtextured surface 314 (disposed on all or a portion of the lower exterior surface portion 312) to impart different aerodynamic properties for the upper and lower surfaces. Use of a sleeve 310 allows for provision of microtextured surfaces over a large (or entire) portion of an aircraft structure 106.

In various examples, the sleeve 310 may be made of an elastic material. FIG. 4 provides a side view of an elastic sleeve 400 in accordance with various examples. The elastic sleeve 400 of FIG. 4 may be understood as an example of the sleeve 310 of FIG. 3. As seen in FIG. 4, in which the sleeve 400 is shown in an unstretched condition, the sleeve 400 has a nominal pre-application cross-sectional area 420. The nominal pre-application cross-sectional area 420 is smaller than a corresponding cross-sectional area 320 (e.g., a cross-sectional area of the aircraft structure at which the cross-section of the elastic sleeve 400 will be located) of the aircraft structure 106 (see FIG. 3). Accordingly, to place the sleeve 400 on the aircraft structure 106, the elastic sleeve 400 is stretched to increase its cross-sectional area, and pulled over an end of the aircraft structure 106 to a desired end location, at which point the elastic sleeve 400 is allowed to compress under its elasticity about the aircraft structure 106, securing the elastic sleeve 400 in place. To remove the elastic sleeve 400, the elastic sleeve 400 is stretched to increase its cross-sectional area and pulled off of the aircraft structure 106. Accordingly, the elastic sleeve 400 may be conveniently placed on the aircraft structure 106 and non-destructively removed. It may be noted that the cross-sectional area of the elastic sleeve 400 may be tapered along the length L to match a taper of the cross-sectional area of the aircraft structure 106.

Figure 5:
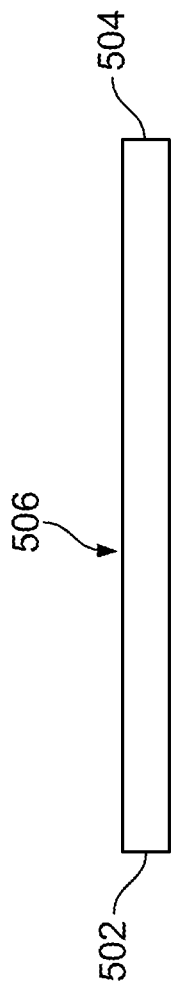
FIG. 5 provides a side schematic view of a sheet used to form a sleeve, accordingly to an example of the present disclosure.
Figure 6:
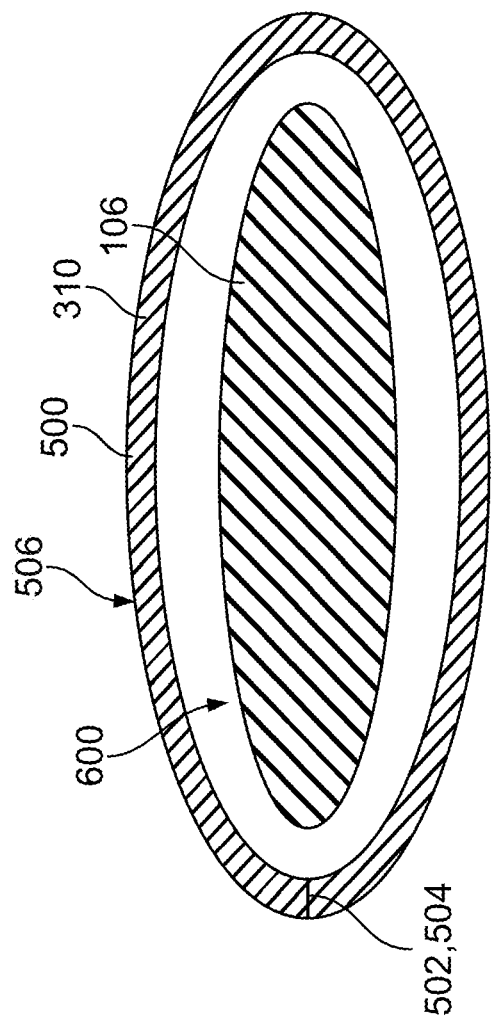
FIG. 6 provide side schematic view of the sheet of FIG. 5 formed into a sleeve.

In various examples, the sleeve 310 may be made of a heat shrinkable material, and be applied as a pre-formed sleeve that has a slightly larger cross-sectional area than a corresponding portion of the aircraft structure 106, and is shrunk to fit the aircraft structure 106 once in place. In other examples, the sleeve 310 may be initially formed as a sheet that is subsequently heat-shrunk onto the aircraft structure 106. For example, FIGS. 5 and 6 provide side schematic views of a sheet 500 used to form a sleeve 310 in accordance with various examples. As seen in FIG. 5, the sheet 500 has a first edge 502 and a second edge 504 opposite the first edge 502, as well as an exterior surface 506. A microtextured surface as discussed herein is disposed on the exterior surface 506, and the sheet 500 is made of a heat-shrinkable material. As seen in FIG. 6, the sheet 500 is joined at an edge (e.g., first edge 502 is joined to second edge 504) after the sheet is disposed around the aircraft structure 106. A gap 600 is shown between the sheet 500 that has been formed into a sleeve 310 and the aircraft structure 106. Once the sleeve 310 is formed and in place, the sleeve 310 may be heat shrunk to be secured to the aircraft structure 106. It may be noted that the ends need not be joined to each other. For example, one end could be joined to an intermediate portion of the sheet, with the portion between the intermediate portion and other end trimmed off after joining, allowing for a more close, customizable fit to a particular size or shape of aircraft structure using a pre-formed sheet. It may be noted that the gap 600 shown in FIG. 6 is fairly large for ease and clarity of illustration; however, the actual gap may be sized to allow for 10% or less shrinkage. Further, in various examples, the sheet 500 may be configured to shrink more along one direction than one or more other directions (e.g., configured to shrink more along the width instead of the length).

Figure 7:
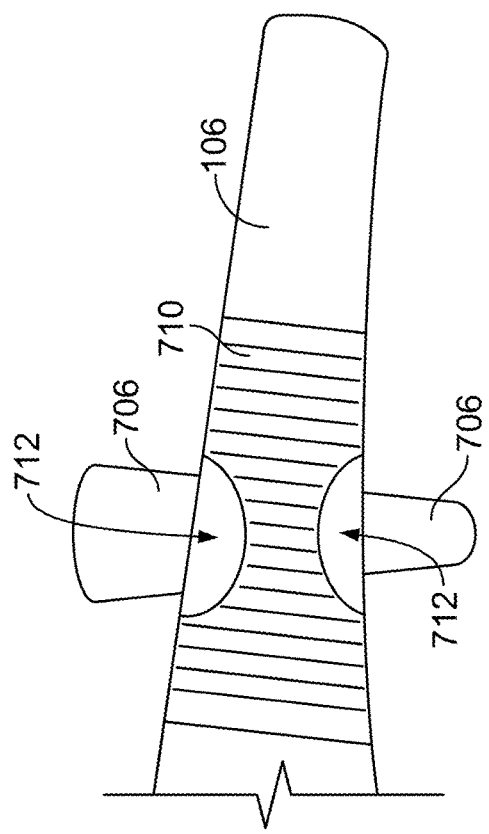
FIG. 7 provides a schematic view of a sleeve, according to an example of the present disclosure.

It may be noted that in various examples, the aircraft structure 106 may have portions (e.g., projections) that are difficult or impractical to cover with a sleeve or other cover member. For example, FIG. 7 depicts an aircraft structure 106 with features 706 (the features are projections in the illustrated example), and a sleeve 710 that includes openings 712 configured to extend around the features 706 of the aircraft structure 106. The sleeve 710 may be understood as an example of the sleeve 310 and includes microtextured surfaces on at least a portion of its exterior surface. The openings 712 may be configured to fit around engine mounts, movable flaps, pitot tubes or other sensing devices, lights, or other features of the aircraft structure 106 that are inappropriate or inconvenient to cover.

In various examples, the cover member 110 (e.g., sleeve 310) may not cover an entire length of the aircraft structure 106. For example, for the example illustrated in FIG. 1, the cover member 110 has a length 111 that is less than the corresponding length L of the aircraft structure 106, with the cover member 110 covering only a portion of the aircraft structure 106 along the length L of the aircraft structure 106. The sleeve 710 of FIG. 7 provides another example of a cover member that has a length that is less than the corresponding length L of the aircraft structure 106.

Figure 8:
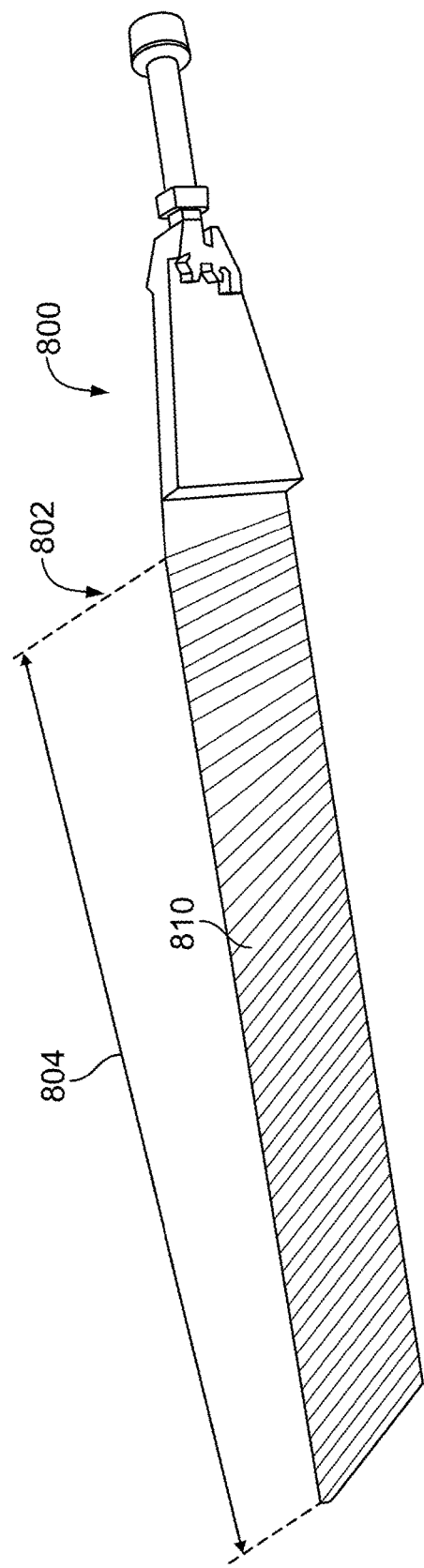
FIG. 8 provides a schematic view of a sleeve, according to an example of the present disclosure.

It may be noted that in other examples, the cover member 110 may cover an entire length of an aircraft structure 106 (e.g., airfoil). For example, FIG. 8 provides a perspective view of a helicopter blade 800 having an airfoil 802, with a cover 810 extending along the entire length 804 of the airfoil 802. The cover 810 may be understood as an example of the cover member 110, and includes a microtextured surface as discussed herein.

It may further be noted that in various examples one or both of the cover member 110 and aircraft structure 106 includes one or more locating features configured to help ensure proper positioning or placement of the cover member 110 on the aircraft structure 106. For example, as seen in FIG. 1, the cover member 110 includes a cover locating feature 190 that is configured to cooperate with a corresponding feature 192 of the aircraft structure 106 for locating the cover member 110 relative to the aircraft structure 106. In the illustrated example, the cover locating feature 190 and corresponding feature 192 are configured to be disposed adjacent to one another when the cover member 110 is positioned in a desired placement; however, it may be noted that other predetermined relationships may be utilized. For example, the cover locating feature 190 may be configured to be placed directly over the corresponding feature 192. It may be noted that the corresponding feature 192 may be printed, painted, or applied as a decal to the aircraft structure 106 in some examples. Alternatively or additionally, an existing structural component (e.g., engine mount, edge or corner of a structure, edge of a flap, or the like) of the aircraft structure 106 may be used in cooperation with the cover locating feature 190.

Figure 9:
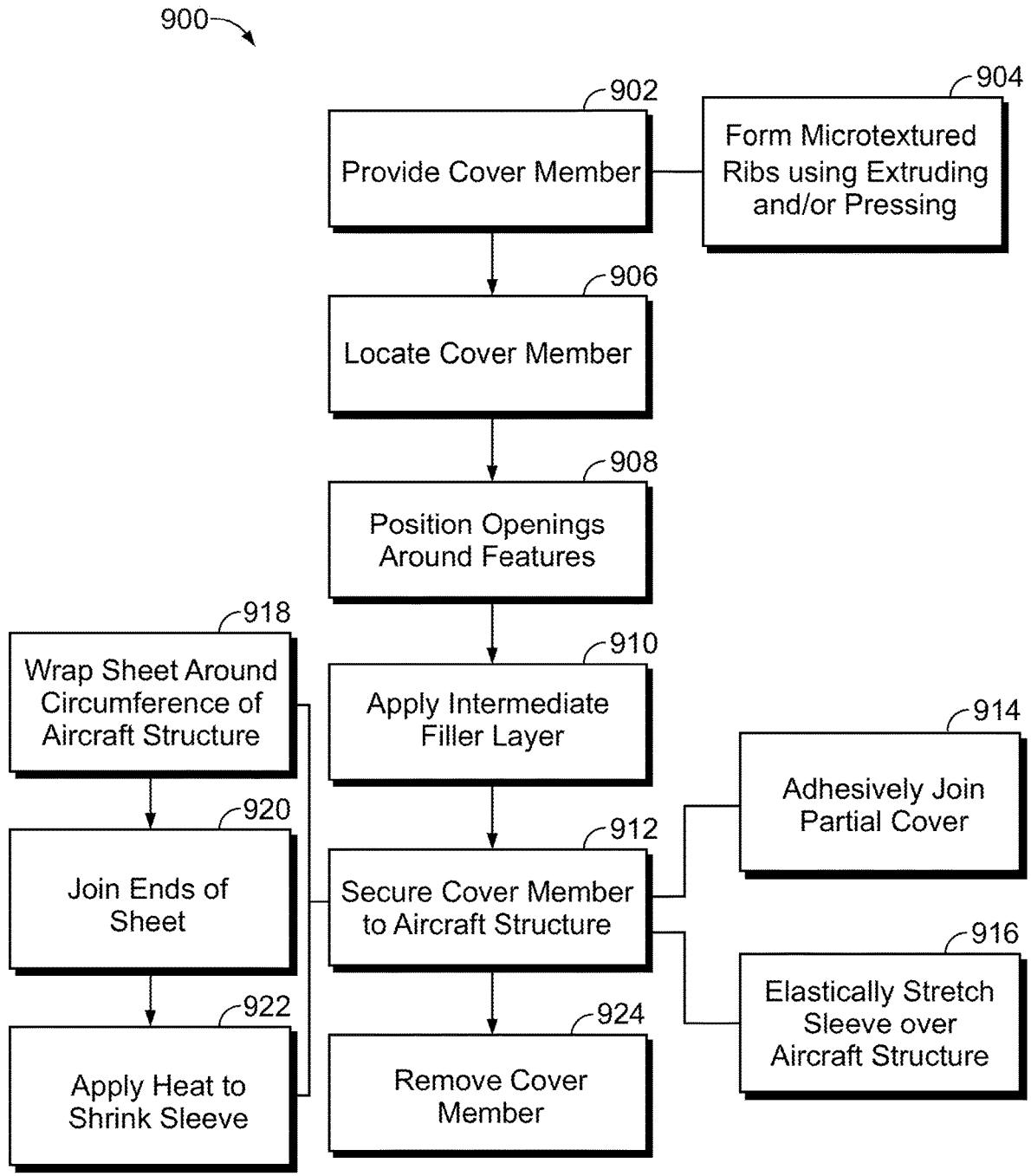
FIG. 9 provides a flowchart of a method, according to an example of the present disclosure.

FIG. 9 illustrates a flowchart of a method 900 for improving aerodynamic performance of an aircraft structure. The method 900, for example, may employ structures or aspects of various examples (e.g., systems and/or methods) discussed herein. In various examples, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 902, a cover member (e.g., cover member 110) is provided. The cover member includes an exterior surface having a microtextured surface that includes microtexture ribs as discussed herein. The microtexture ribs are configured to improve the aerodynamic performance of an aircraft structure (e.g., aircraft structure 106) to which the cover member will be mounted. Various techniques may be employed to form the cover member, which may be formed as a sheet (e.g., sheet 500), for example, or a partial cover (e.g., partial cover 210), as another example, or a sleeve (e.g., sleeve 310) as another example. The cover member in various examples may be made of an elastic and/or heat-shrinkable material. In the illustrated example, at 904, the microtexture ribs are formed on the exterior surface of sleeve using at least one of extruding or pressing.

At 906 of the illustrated example, the cover member is located at a predetermined position relative to the aircraft structure. In various examples, a cover locating feature of the cover member that cooperates with a corresponding feature of the aircraft structure is used to locate the cover member at the predetermined position. Locating the cover member in a predetermined position in various examples also includes orienting microtextured protrusions (or ribs) in a predetermined pattern relative to the aircraft structure to provide improved aerodynamic performance.

At 908, openings of the cover member are positioned around features of the aircraft structure when positioning the cover member. For example, in examples utilizing a sheet, the openings may be positioned around the features when the sheet is wrapped around the circumference of the aircraft structure (e.g., to form a sleeve). It may be noted that this step may be omitted for cover members that are not placed near or around any features that are undesirable or impractical to cover.

In some examples, an intermediate filler layer may be utilized, for example, to improve fit and/or adhesion between the cover member and the aircraft structure, to ease removal of the cover member, and/or to protect the aircraft structure. In the illustrated example, at 910, an intermediate filler layer is applied to a surface of the aircraft structure before securing the cover member.

At 912, the cover member is secured to the aircraft structure. As discussed herein, in various examples, the cover member is removably secured to the aircraft structure. Various techniques may be employed in various examples to secure the cover member to the aircraft structure.

For example, in some examples, at 914, a partial cover (e.g., partial cover 210) is adhesively joined to a leading portion of the aircraft structure.

As another example, in some examples the cover member includes or is configured as a sleeve made of an elastic material. For such a sleeve, at 916, the sleeve is elastically stretched over the aircraft structure, and allowed to constrict onto the aircraft structure to secure the sleeve to the aircraft structure.

As another example, in some examples, a heat-shrinkable material is used. For example, at 918, a sheet is wrapped around a circumference of the aircraft structure. At 920, ends of the sheet are joined to each other to form a sleeve. At 922, heat is applied to shrink the sleeve onto the aircraft structure.

As noted herein, in various examples, the cover member is removably secured to the aircraft structure. For example, in the illustrated example, at 924, the cover member is removed from the aircraft structure. Removal of the cover member allows for repair and/or replacement of the cover member without having to re-work any surfaces of the aircraft structure, reducing the time and cost of maintenance of a microtextured surface for an aircraft structure. In some examples, the cover member may be removed without damaging the cover member, for example, by stretching an elastic material of the cover member to pull the cover member off of a wing or other aircraft structure to which it was mounted.

Figure 10:
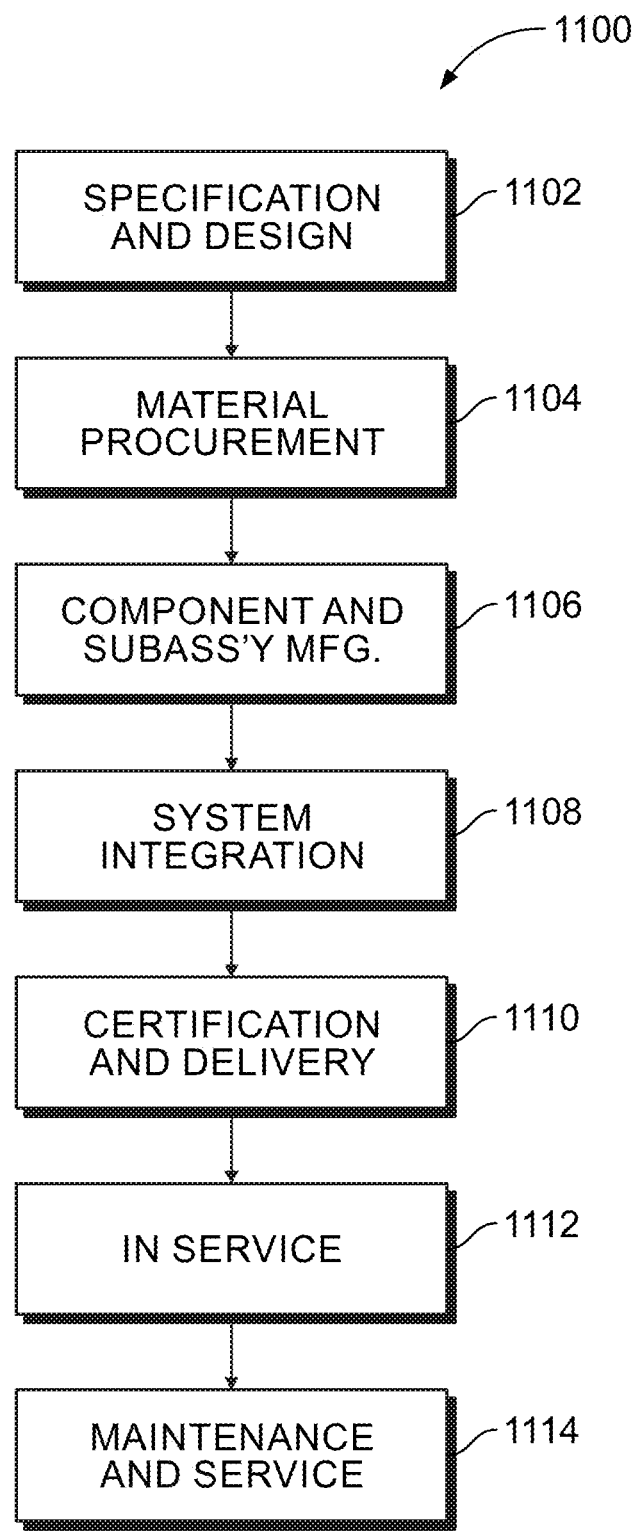
FIG. 10 is a block diagram of aircraft production and service methodology.
Figure 11:
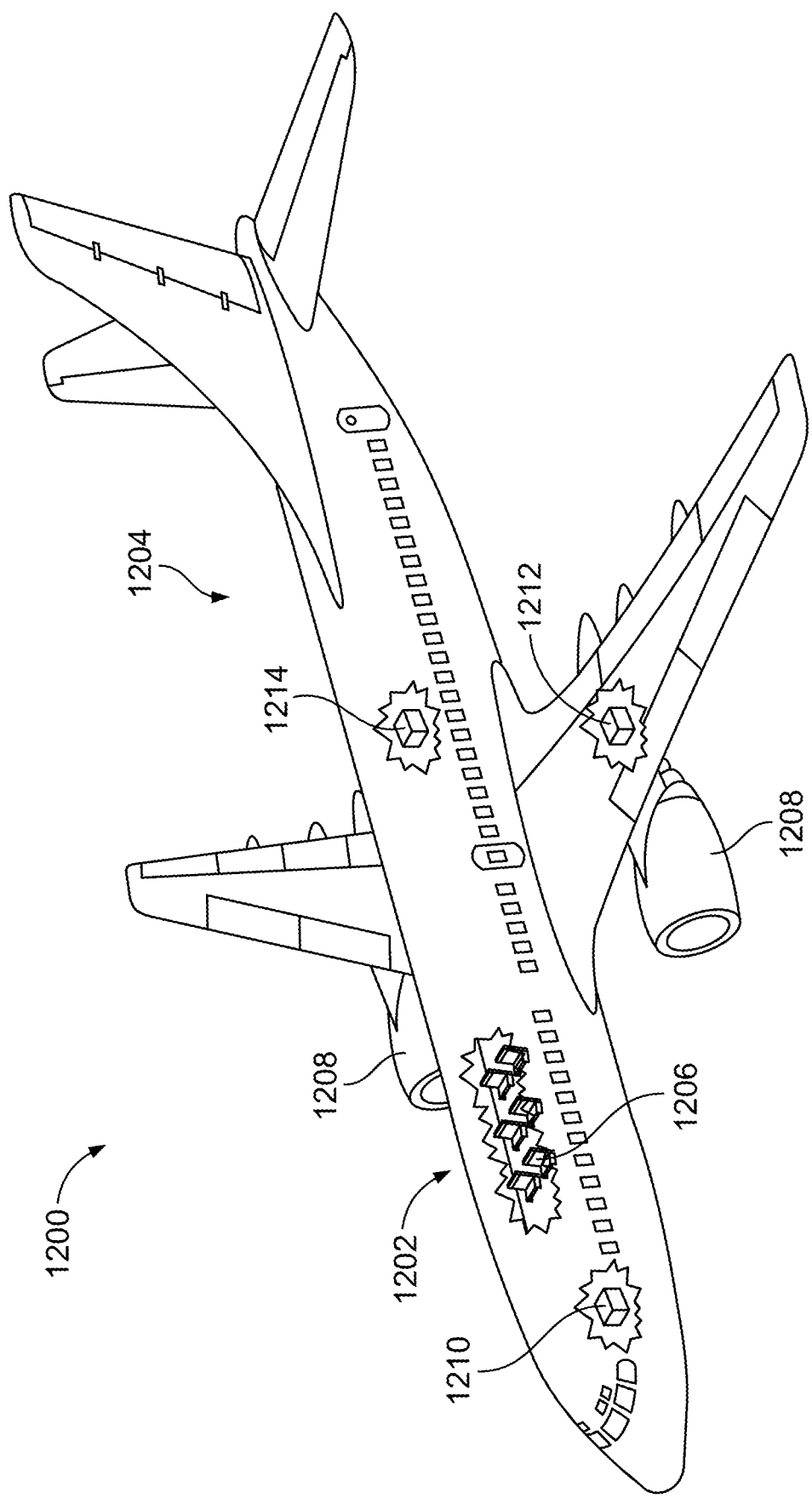
FIG. 11 is a schematic perspective view of an aircraft.

Examples of the disclosure may be described in the context of an aircraft manufacturing and service method 1100 as shown in FIG. 10 and an aircraft 1200 as shown in FIG. 11. During pre-production, illustrative method 1100 may include specification and design 1102 of the aircraft 1200 and material procurement 1104. During production, component and subassembly manufacturing 1106 and system integration 1108 of the aircraft 1200 take place. Thereafter, the aircraft 1200 may go through certification and delivery 1110 to be placed in service 1112. While in service by a customer, the aircraft 1200 is scheduled for routine maintenance and service 1114 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 11, the aircraft 1200 produced by the illustrative method 1100 may include an airframe 1202 with a plurality of high-level systems 1204 and an interior 1206. Examples of high-level systems 1204 include one or more of a propulsion system 1208, an electrical system 1210, a hydraulic system 1212, and an environmental system 1214. Any number of other systems may be included. Although an aerospace example is shown, the principles of the disclosure may be applied to other industries, such as the automotive industry. Accordingly, in addition to aircraft 1200, the principles disclosed herein may apply to other vehicles, e.g., land vehicles, marine vehicles, space vehicles, etc.

Apparatus and methods shown or described herein may be employed during any one or more of the stages of the manufacturing and service method 1100. For example, components or subassemblies corresponding to component and subassembly manufacturing 1106 may be fabricated or manufactured in a manner similar to components or subassemblies produced while the aircraft 1200 is in service. Also, one or more aspects of the apparatus, method, or combination thereof may be utilized during the production stages 1106 and 1108, for example, by substantially expediting assembly of or reducing the cost of an aircraft 1200. Similarly, one or more aspects of the apparatus or method realizations, or a combination thereof, may be utilized, for example and without limitation, while the aircraft 1200 is in service, e.g., maintenance and service 1114.

While various spatial and directional terms, such as top, bottom, lower, mid, lateral, horizontal, vertical, front and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft surface cover comprising:
a cover member configured to be removably secured to an airfoil structure, the cover member comprising an exterior surface, the exterior surface having a microtextured surface comprising microtexture ribs configured to improve aerodynamic performance of the airfoil structure,
wherein the cover member comprises a sleeve configured to extend around a circumference of the airfoil structure, and
wherein the sleeve is made of an elastic material, the sleeve having a nominal pre-application cross-sectional area that is smaller than a corresponding cross-sectional area of the airfoil structure.

2. The aircraft surface cover of claim 1, wherein the cover member comprises a partial cover configured to cover a leading portion of the airfoil structure, the partial cover configured to be adhesively joined to the airfoil structure.

3. The aircraft surface cover of claim 1, wherein the sleeve is made of a heat-shrinkable material, wherein the sleeve comprises a sheet configured to be joined at an edge when disposed around the airfoil structure.

4. The aircraft surface cover of claim 1, wherein the sleeve includes openings configured to extend around features of the airfoil structure.

5. The aircraft surface cover of claim 1, wherein the sleeve has a length that is less than a corresponding length of the airfoil structure, wherein the sleeve is configured to cover only a portion of the airfoil structure.

6. The aircraft surface cover of claim 1, further comprising a cover locating feature configured to cooperate with a corresponding feature of the airfoil structure for locating the cover member relative to the airfoil structure.

7. The aircraft surface cover of claim 1, wherein the microtexture ribs have a height that does not exceed 0.5 millimeters, and wherein a spacing between adjacent microtexture ribs does not exceed 1 millimeter.

8. The aircraft surface cover of claim 1, wherein the sleeve has the nominal pre-application cross-sectional area that is smaller than a corresponding cross-sectional area of the airfoil structure before the sleeve is disposed around the circumference of the airfoil structure.

9. The aircraft surface cover of claim 1, wherein to place the sleeve on the airfoil structure, the sleeve is stretched to increase the cross-sectional area, and pulled over an end of the airfoil structure to a desired end location, at which point the sleeve is allowed to compress under elasticity about the airfoil structure, securing the sleeve in place.

10. A method of improving aerodynamic performance of an airfoil structure, the method comprising:
providing a cover member comprising an exterior surface, the exterior surface having a microtextured surface comprising microtexture ribs configured to improve aerodynamic performance of the airfoil structure; and
securing the cover member to the airfoil structure, wherein the cover member comprises a sleeve made of an elastic material, the sleeve having a nominal pre-application cross-sectional area that is smaller than a corresponding cross-sectional area of the airfoil structure, wherein said securing the cover member comprises elastically stretching the sleeve over the airfoil structure, and allowing the sleeve to constrict onto the airfoil structure.

11. The method of claim 10, wherein securing the cover member comprises adhesively joining a partial cover to a leading portion of the airfoil structure.

12. The method of claim 10, wherein the sleeve comprises a sheet of heat-shrinkable material, wherein securing the cover member comprises:
wrapping the sheet around a circumference of the airfoil structure;
joining ends of the sheet to each other; and
applying heat to shrink the sleeve onto the airfoil structure.

13. The method of claim 12, further comprising positioning openings of the sleeve around features of the airfoil structure when wrapping the sheet around the circumference of the airfoil structure.

14. The method of claim 10, further comprising locating the cover member at a predetermined position relative to the airfoil structure via a cover locating feature that cooperates with a corresponding feature of the airfoil structure.

15. The method of claim 10, further comprising removing the cover member from the airfoil structure.

16. The method of claim 10, further comprising applying an intermediate filler layer to a surface of the airfoil structure before securing the cover member.

17. The method of claim 10, further comprising forming the microtexture ribs on the exterior surface of the sleeve using at least one of extruding or pressing.

18. The method of claim 10, wherein the sleeve has the nominal pre-application cross-sectional area that is smaller than a corresponding cross-sectional area of the airfoil structure before the sleeve is disposed around the circumference of the airfoil structure.

19. An aircraft assembly comprising:
an airfoil structure disposed on an exterior of an aircraft; and
a cover member removably secured to the airfoil structure, the cover member comprising an exterior surface, the exterior surface having a microtextured surface comprising microtexture ribs configured to improve aerodynamic performance of the airfoil structure,
wherein the cover member comprises a sleeve extending around a circumference of the airfoil structure, the sleeve having a nominal pre-application cross-sectional area that is smaller than a corresponding cross-sectional area of the airfoil structure.

20. The aircraft assembly of claim 19, wherein the cover member comprises a partial cover that covers a leading portion of the airfoil structure.

21. The aircraft assembly of claim 19, wherein the sleeve has the nominal pre-application cross-sectional area that is smaller than a corresponding cross-sectional area of the airfoil structure before the sleeve is disposed around the circumference of the airfoil structure, and wherein to place the sleeve on the airfoil structure, the sleeve is stretched to increase the cross-sectional area, and pulled over an end of the airfoil structure to a desired end location, at which point the sleeve is allowed to compress under elasticity about the airfoil structure, securing the sleeve in place.

* * * * *